3,577,527
NEISSERIA MENINGITIDIS ANTIGEN
Earl A. Edwards, Lake Bluff, Ill., assignor to the United States of America as represented by the Secretary of the Navy
No Drawing. Filed Jan. 27, 1969, Ser. No. 794,341
Int. Cl. A61k 27/00
U.S. Cl. 424—92    8 Claims

ABSTRACT OF THE DISCLOSURE

An antigen of N. meningitidis which has a high degree of sensitivity and specificity for determining the presence of antibodies in blood is provided by a method in which N. meningitidis is subjected to a mild alkaline hydrolysis with production of a lipopolysaccharide antigen.

---

The invention described herein may be manufactured and used by or for the Government of the United States of America for governmental purposes without the payment of any royalties thereon or therefor.

This invention relates to a method of preparing an antigen of Neisseria meningitidis which is suitable for serological testing and also as an immunizing agent or vaccine.

BACKGROUND OF THE INVENTION

Serological testing has been heretofore known for determining the presence in blood of humans of antibodies derived from previous infections with N. meningitidis. Indirect or passive hemagglutination (PHA) has become one of the most widely used methods for measuring various antibodies. In the hemagglutination test, the antigen is attached or adsorbed to a particulate for visual observation, for example, red blood cells which may be human or animal. The known serological tests have not been satisfactory from the standpoint of sensitivity and specificity for N. meningitidis antibodies.

STATEMENT OF INVENTION

I have found that an antigen of N. menigitidis which has a high degree of sensitivity and specificity for determining the presence of antibodies in blood is provided by a method in which N. meningitidis is subjected to a mild alkaline hydrolysis with production of a lipopolysaccharide antigen. This antigen will absorb to an unmodified rbc. to cause the rbc. to agglutinate in the presence of antibody which is homologous to the species of N. meningitidis from which the antigen was produced.

The preparation of the new antigen is illustrated by the following specific examples. In these examples the culture medium was a Mueller-Hinton broth (Difco-Code 0757) containing beef infusion—300 grams, casamino acids—17.5 grams and soluble starch—1.5 grams. Stock cultures of different N. meningitidis groups were used, namely, groups A, B, C, Bo (Cochard) and 29E.

Example 1

Separate cultures of each of the five groups, A, B, C, Bo and 29E were prepared by adding one ml. of 8-hour Mueller-Hinton broth shake culture into a 250 ml. Mueller-Hinton broth and incubated at 37° C. for 18 hours in a Psycrotherm Incubator shaker (170–200 rotations/minute) with normal atmospheric air.

As a safety precaution, cultures were then inactivated with beta-propiolactone (1% final concentration) and 1 hour at room temperature and overnight at 6° C. The sediment was collected by centrifugation (600× $g$) washed 3 times with 0.15 M NaCl (saline) and resuspended in 10 ml. of saline. The suspension was adjusted to pH 11.0 with 1 N NaOH, incubated for 1 hour at room temperature and then readjusted to pH 6.5 with 1 N HCl. The suspension was precipitated with 5 volumes of absolute ethanol. The precipitate was collected by centrifugation (3000× $g$) and resuspended in 20 ml. saline. The insoluble residue was removed by centrifugation and discarded. The clear supernatant contained a soluble group specific antigen which was used to sensitize sheep rbc.

Sheep rbc. were collected in Alsever's solution and stored at 6° C. for from 6 to 30 days. Equal volumes of a saline washed 2% rbc. suspension were mixed with the antigen. The mixture was incubated in a 37° C. water bath for 1 hour with occasional shaking. The rbc.'s were then sedimented by centrifugation (200× $g$), washed once with saline, and resuspended to an 0.5% suspension in 0.01 M phosphate buffered saline, pH 7.2, containing normal rabbit serum at a final concentration of 1:200 (NRPBS). The rabbit serum was absorbed with sheep rbc.'s (0.1 ml. packed washed sheep rbc./ml. inactivated serum) to remove non-specific agglutinins.

Increments of 2-fold dilutions of each inactivated (56° C. for 30 minutes) test serum (commercial) were made in 0.025 ml. NRPBS diluent in Microtiter "V" plates. One drop (0.025 ml.) of the sensitized rbc.'s was added to each well, carefully mixed, and incubated at 37° C. The tests were read when the cell control (containing 0.025 ml. NRPBS and 0.025 ml. test cells) formed a button (about 1 hour). The antibody titer was considered to be the reciprocal of the highest dilution of the serum that agglutinated 75% or more of the rbc.'s. Serum controls using 0.5% suspension of non-sensitized sheep rbc.'s and test sera were used to detect non-specific or Forssman antibody hemagglutination. Such sera were absorbed for 1 hour at room temperature with an equal volume of a 50% suspension of washed sheep rbc.'s.

Results. Table I shows the high order of specificity obtained with various hyperimmune sera when sheep rbc.'s were sensitized with homologous and heterologous meningococcal antigens. Prozones were never observed and cross-reactions were minimal (1:2 or less).

TABLE I

[Specificity of the passive hemagglutination antibody test using various antisera against homologous and heterologous sensitized erythrocytes]

| Antiserum | A | B | C | Bo | 29E |
|---|---|---|---|---|---|
| Anti-N.meningitidus—Group: | | | | | |
| A | 1:256 | <1:2 | <1:2 | <1:2 | <1:2 |
| B | 1:2 | 1:32 | <1:2 | <1:2 | <1:2 |
| C | <1:2 | <1:2 | 1:256 | <1:2 | <1:2 |
| Bo | <1:2 | <1:2 | <1:2 | 1:512 | <1:2 |
| F | <1:2 | <1:2 | <1:2 | <1:2 | 1:512 |
| Anti-N.gonorrhoeae | <1:2 | <1:2 | <1:2 | <1:2 | <1:2 |
| Anti-N.perflava | <1:2 | <1:2 | <1:2 | <1:2 | <1:2 |
| Anti-N.flavescens | <1:2 | <1:2 | <1:2 | <1:2 | <1:2 |

In my method, mild alkaline hydrolysis and alcohol precipitation produced N. meningitidis antigen extracts with sensitizing potency in dilutions ranging from 1:50 to 1:100 for one sensitizing unit. These antigens retain their sensitizing capacity and specificity, after storage at 6° C., for over 4 months. Sensitized rbc.'s have been shown to be usable for at least 1 week without loss of specificity or sensitivity. Further, it was found that sheep rbc.'s could be sensitized with at least 5 meningococcal antigens, either consecutively or simultaneously, and still retain their specificity and sensitivity.

In a large series of naval recruits studied, where paired sera and bacterial samples were available, there was excellent agreement between the meningococcal PHA test and bacterial recovery.

Example 2

The procedure of Example 1 was repeated for preparation of individual cultures of the above groups of N.

*meningitidis* and for the centrifugal separation of the sediment, and subsequent washing with saline solution of the recovered sediment and resuspension of the washed sediment in 10 ml. of saline solution. The resulting suspension was made alkaline with 1 N NaOH to pH 10 under stirring. The alkaline mixture was allowed to stand for 2 hours at room temperature and then neutralized with 1 N HCl to pH 7.0. Ethanol was added to the neutral suspension to a final concentration therein of 20% ethanol by volume. The precipitated sediment was discarded by centrifugal separation and to the fluid portion ethanol was added to a final concentration of 85% by volume. After mixing under agitation, the suspension was allowed to stand overnight at 6° C. and centrifuged with collection of the sediment which is the lipopolysaccharide antigen. The latter was suspended in 5 ml. of phosphate-buffered saline solution (Sorenson's buffer-.01 molar-pH 7.2).

The buffered suspension of the antigen was charged on to a gel chromatographic column packed cross-linked dextran (Sephedex G–200), equilibrated with Sorenson's buffer (above) 5 ml. fractions of the eluant from the column were collected and each fraction tested for hemagglutination activity (HA) as described above in respect to the serological test procedure. The fractions with HA were pooled and the antigen precipitated therefrom by addition of 5 volumes of ethanol. The sediment or antigen was collected by centrifugation and dissolved in 5 ml. of phosphate-buffered saline solution of pH 7.2 (Sorenson's buffer above).

The antigen of each of the groups A, B, C and 29E, prepared as in Example 2, was evaluated for immuniological activity in mice (Swiss-Webster strain) by injecting the antigen in $\frac{1}{10}$ ml. doses (7½ micrograms) subcutaneously into the mice at two intervals, one week apart. The treated mice were challenged 7 days following the second injection with live *N. meningitidis*. Survival rates of the treated mice were compared with those for the non-treated mice (placebo group) over a period of 72 hours. The $LD_{50}$ was determined in the placebo group. The treated mice had a survival of from 60 to 400 $LD_{50}$'s.

The antigen of the groups A and C prepared by Example 2 has provoked an antibody response in one human volunteer without adverse or toxic effects. Antigens prepared from *N. meningitidis* by the procedure of Example 2 are non-toxic to humans in doses of from 5 to 10 micrograms and appear to have the properties essential to activity as vaccine in the immunization of humans for prevention of clinical meningitis. For human vaccination, by subcutaneous injection, the antigen preparation is sterilized by filtration through 0.2 micron millipore filter.

Whereas the invention has been described herein with reference to certain specific embodiments thereof, these are intended by way of illustration and not in limitation except as may be defined in the appended claims.

What is claimed and desired to be secured by Letters Patent of the United States is:

1. A method of producing an antigen extract which comprises, culturing *Neisseria meningitidis* under aerobic conditions in a nutrient medium separating the solids from the resulting culture and suspending them in saline solution, subjecting the resulting suspension to mild alkaline hydrolysis in the presence of sodium hydroxide at a pH in the range of from about 9–12 for about 1–2 hours at room temperature, neutralizing the resulting hydrolysis to about pH 6.5–7, precipitating the neutralized suspension by the addition of ethanol thereto, collecting the resulting precipitate and suspending it in physiological salt solution, separating the solids from the physiological salt solution and collecting a clear solution of antigen extract.

2. A method as defined in claim 1, wherein the alkaline hydrolysis is conducted at a pH of about 10.

3. A method as defined in claim 1, wherein the physiological salt solution is selected from the group consisting of saline solution, phosphate-buffered saline solution and tris (4-hydroxyphenyl) methane.

4. A method as defined in claim 3, wherein the clear solution of the antigen extract is fractionated by exclusion chromatography.

5. A method as defined in claim 4, wherein the fractionation is conducted by gel permeation chromatography.

6. A method as defined in claim 5, and collecting and pooling the fractions from the gel permeation chromatography which exhibit hemagglutination activity, precipitating the antigen from the pooled solution by the addition thereto of ethanol in amount to give a final solution concentration of at least about 80% by volume ethanol, collecting the precipitated antigen and dissolving it in a physiological salt solution of the group consisting of saline solution and phosphate-buffered saline solution.

7. A method of inducing immunity of an animal against pathogenocity of *Neisseria Meningitidis* which comprises subcutaneously injecting into the animal a safe and effective amount of the antigen extract made by the method of claim 6.

8. A method of inducing immunity in a human against pathogenocity of *Neisseria Meningitidis* which comprises subcutaneously injecting into the human a safe and effective amount of the antigen extract made by the method of claim 6.

References Cited

UNITED STATES PATENTS 3,480,610   11/1969   Fox _____ 424—92

RICHARD L. HUFF, Primary Examiner

U.S. Cl. X.R.

424—12